United States Patent
Cosgrave

[11] Patent Number: 6,105,985
[45] Date of Patent: Aug. 22, 2000

[54] HAND AND FOOT POWERED BICYCLE

[76] Inventor: James T. Cosgrave, 4735 Gundry Ave., Long Beach, Calif. 90807

[21] Appl. No.: 09/247,112

[22] Filed: Feb. 8, 1999

Related U.S. Application Data

[63] Continuation-in-part of application No. 08/861,036, May 21, 1997, abandoned.

[51] Int. Cl.$^7$ ........................................................ B62M 1/12
[52] U.S. Cl. ........................ 280/248; 280/304.3; 280/234
[58] Field of Search ................................. 280/242.1, 244, 280/245, 247, 248, 249, 250, 288.4, 304.3, 304.4, 230, 233, 234

[56] References Cited

U.S. PATENT DOCUMENTS

| | | | |
|---|---|---|---|
| 551,667 | 12/1895 | Dunn | 280/247 |
| 598,026 | 1/1898 | Slippern | 280/247 |
| 1,595,857 | 8/1926 | Coffman | 280/248 |
| 3,848,891 | 11/1974 | Vittori | 280/250 |
| 4,105,220 | 8/1978 | Pacific | 280/304.4 |
| 4,403,787 | 9/1983 | Shimano | 280/304.3 |
| 5,082,302 | 1/1992 | Nacar | 280/234 |
| 5,280,936 | 1/1994 | Schmidlin | 280/244 |
| 5,762,350 | 6/1998 | Jolly | 280/245 |

*Primary Examiner*—Kevin Hurley
*Attorney, Agent, or Firm*—Dennis Beech

[57] ABSTRACT

The hand and foot powered bicycle has an elongated frame supported by a front and rear wheel. A handle bar lever is mounted to the frame adjacent to the steering column such that the handle bar lever may be raised and lowered by moving the attached handle bar up and forward and down and rearward. The handle bar lever is connected to a front sprocket wheel by lever arm linkage attached to sprocket wheel crank arms. This front sprocket wheel is linked to the rear wheel gears by two chain loops and a mid sprocket wheel assembly. With this linkage, as the handle bar is raised and lowered, this motion is translated to rotate the rear wheels. The hand and foot powered bicycle is steered by the handle bar connected to the front wheel forks through a pair of steering cables which are crossed between their abutments to give a correct turn for a turn of the handle bar. Pedals with cranks may be attached to the sprocket wheels as in the conventional manner to provide the combination of hand and foot power for the bicycle.

9 Claims, 5 Drawing Sheets

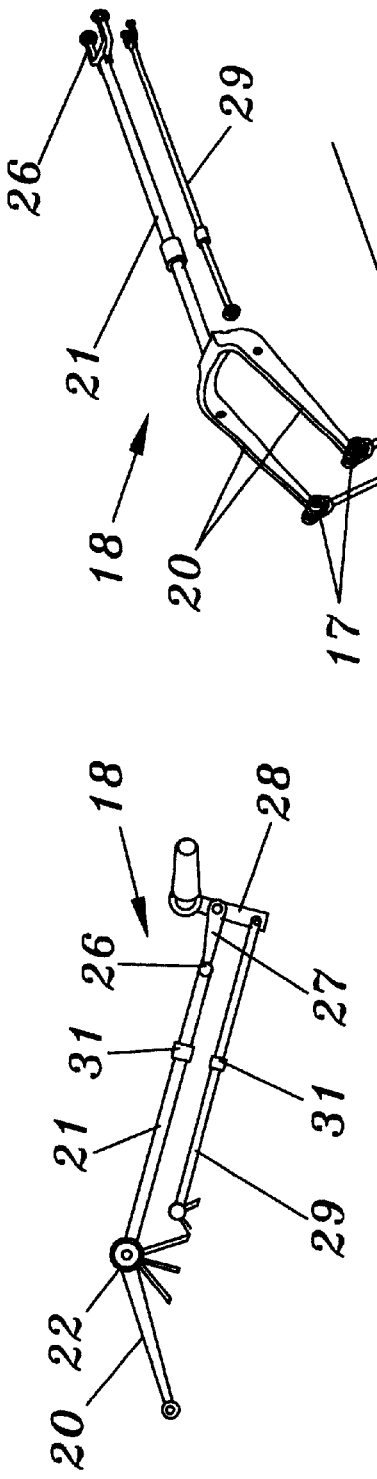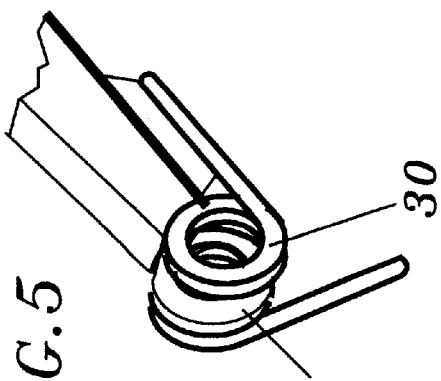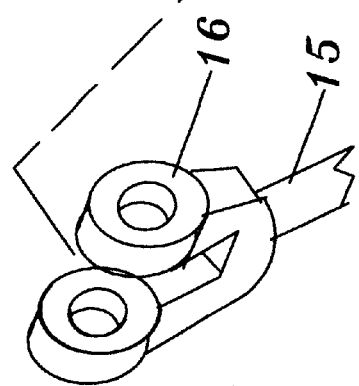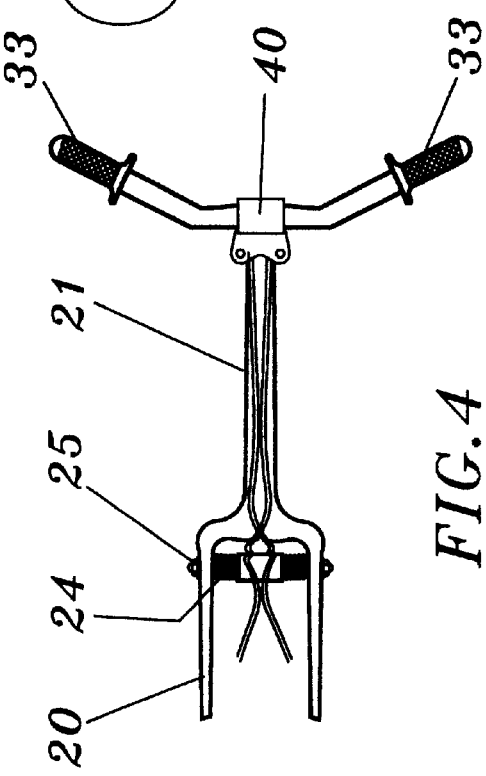

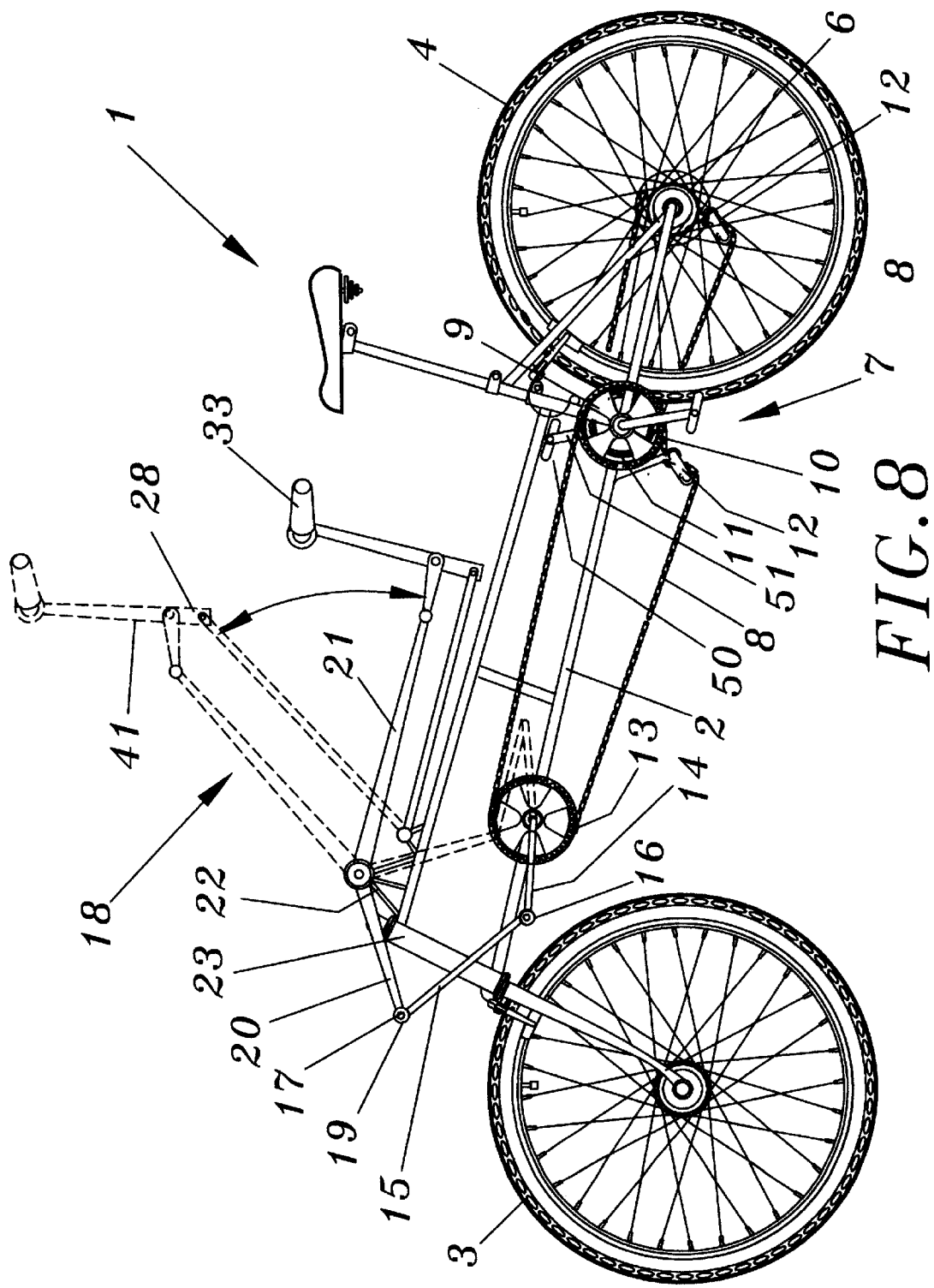

HAND AND FOOT POWERED BICYCLE

This application is a C.I.P. of Ser. No. 08/861,036 filed May 21, 1997, abandoned.

BACKGROUND OF THE INVENTION

1. Field of the Invention

This invention relates to bicycles and other devices used to travel from place to place and during such travel to also exercise portions of the body. The new device provides a bicycle which may be powered by the movement of a lever by the bicycle rider and also may incorporate foot pedals. The rider primarily uses the upper body muscle power to operate the lever. The whole body may be used to power the bicycle with the use of foot pedals.

2. Description of Related Art

There are currently in use various cycles whether two, three or four wheel devices which have hand levers to operate the cycle. Generally these cycles have a pair of levers which alternately are pushed and pulled to cause a rotating gear element associated with a wheel shaft to translate the back and forth longitudinal motion into rotation to turn a wheel. Such means to power are also well known in the small toy cars for children which use foot peddles in a similar manner to turn the back wheels of the toy car.

The present invention uses a single lever action which to the bicycle rider is an up and down power motion. This lever movement is used to rotate a modified bicycle sprocket wheel which is chain and sprocket wheel linked to the rear wheel of the bicycle. The bicycle rider moves the handle bar up and down by use of his/her hands and arms and can use the whole body by lifting up off the bicycle seat. In an alternate embodiment foot pedals are used in the conventional manner in combination with the hand lever action. In this manner with either embodiment the whole body may be exercised rather than just the legs as in the traditional bicycle.

SUMMARY OF THE INVENTION

One object of the present invention is to provide a means to power a bicycle by a lever action which is operated through the bicycle handle bar by the bicycle rider. Another object is to allow the bicycle rider to rise up off the seat of the bicycle in the process of operating the lever. An additional object is to provide a combination of lever action and foot pedal action to power a bicycle. A further object is for the lever and handle bar mechanisms to allow safety features in the event the rider impacts the handle bar.

In accordance with the description presented herein, other objectives of this invention will become apparent when the description and drawings are reviewed.

BRIEF DESCRIPTION OF THE DRAWING

FIG. 3 illustrates a partial side view of the handle bar and lever.

FIG. 4 illustrates a top view of the handle bar and lever.

FIG. 5 illustrates a partial perspective view of the lever, sprocket wheel lever arm linkage and the sprocket wheel with crank arms.

FIG. 5A illustrates the bias spiral spring for the sprocket wheel lever arm linkage.

FIG. 8 illustrates a side elevation view of an alternate embodiment in which foot pedals are incorporated.

DESCRIPTION OF THE PREFERRED EMBODIMENT

The hand and foot powered bicycle has a somewhat elongated frame as compared to that found with the standard bicycle. This provides for an approximately 2 foot lever arm to which the handle bar is attached. The lever is attached and rotates about a pivot. point near the front wheel steering column. The lever is linked to a front sprocket wheel by a lever arm linkage attached to sprocket wheel crank arms. As the handle bar lever is pushed up and pulled down by the bicycle rider, the sprocket wheel is caused to rotate about its axis. A chain loop is linked between the front sprocket: wheel and a mid sprocket wheel assembly which is further linked by a chain loop to the rear wheel gear system. Through this system of levers and gears, or wheels and chain loops, the bicycle rider may power the bicycle. The bicycle rider may rise up from the seat when raising the lever and recede on the pull down portion of the lever motion. Traditional foot pedals are also used in combination with the lever to provide dual power operation of the bicycle.

Figure 1:
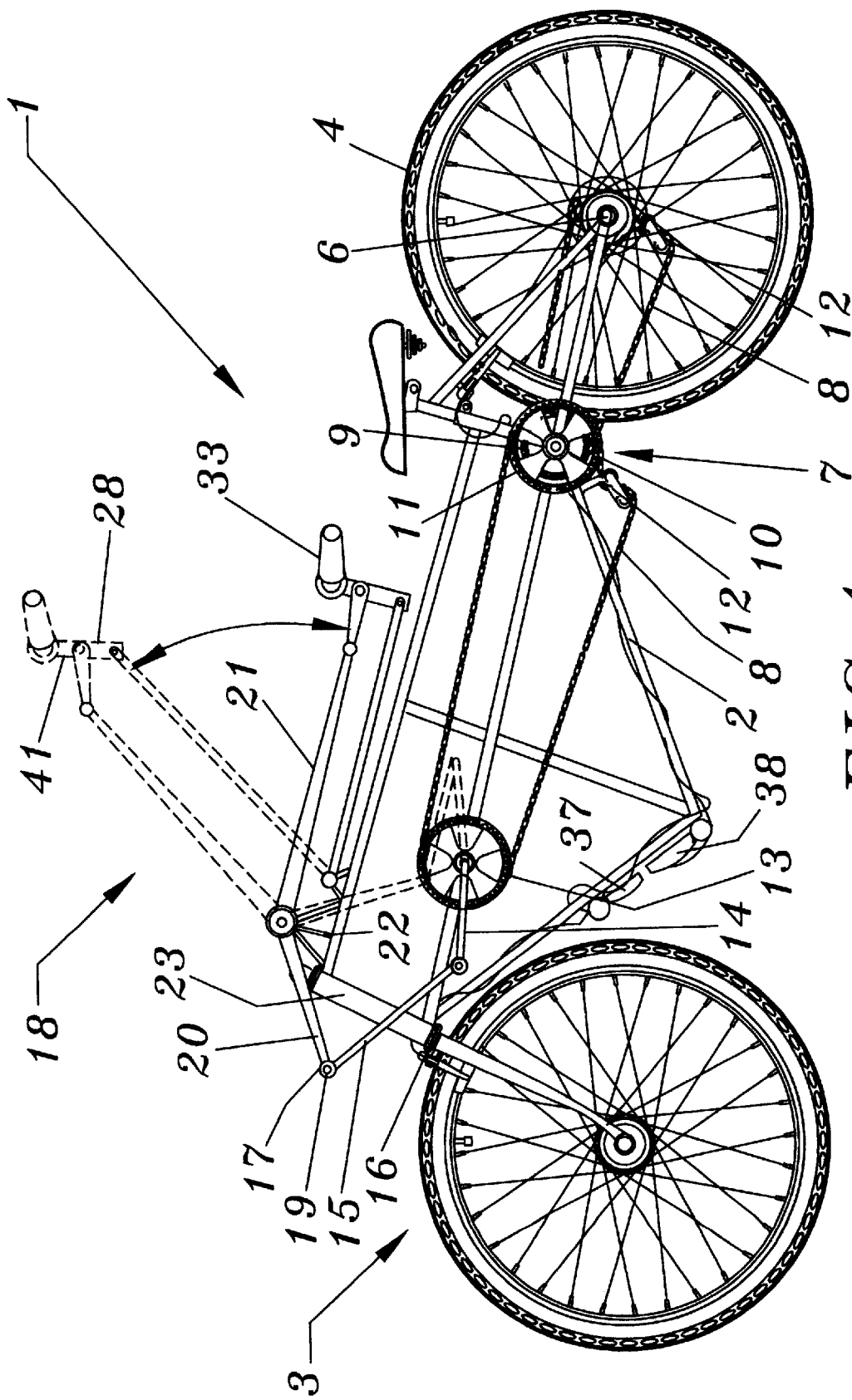
FIG. 1 illustrates a side elevation view of the hand powered bicycle.
Figure 2:
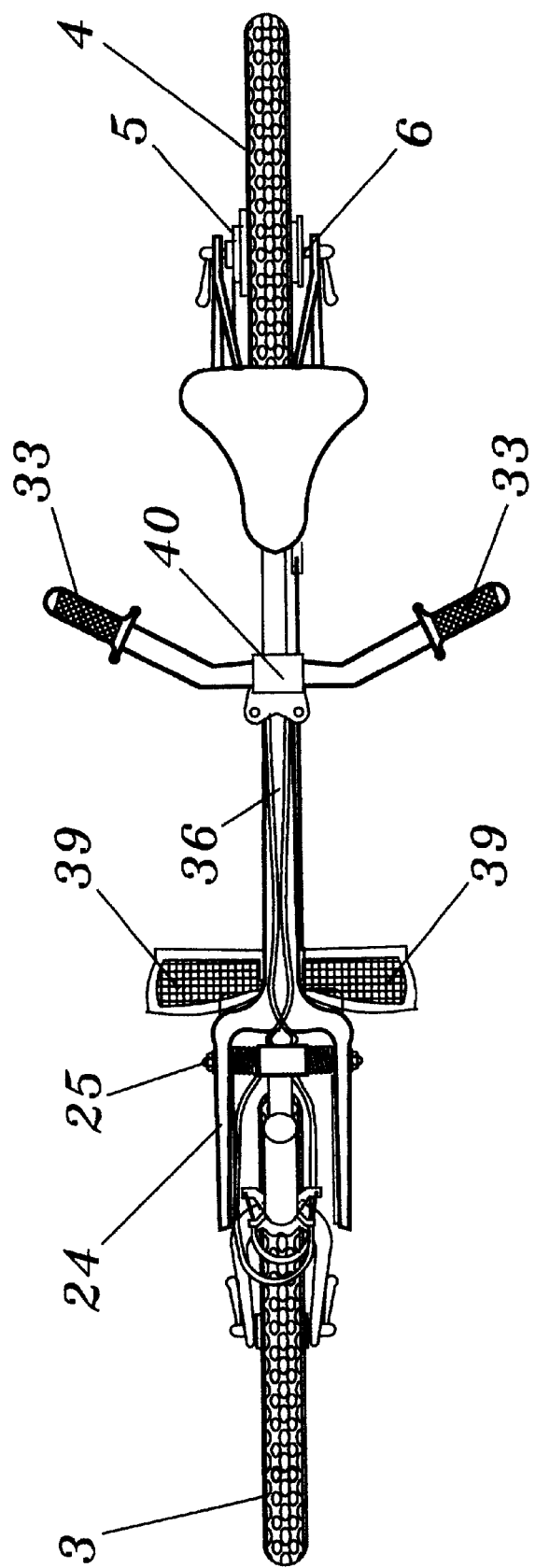
FIG. 2 illustrates a top view of the hand powered bicycle.

Referring to FIGS. 1 and 2, the hand powered version of the bicycle (1) has an elongated frame (2) supported by front wheel (3) and rear wheel (4). The rear wheel (4) has a typical rear wheel gear (5) having multiple gear positions attached to the rear wheel axle (6). The rear wheel gear (5) is linked to a mid sprocket wheel assembly (7) by a chain loop (8).

The mid sprocket wheel assembly (7) has a right side sprocket wheel (9) and a left side sprocket wheel (10) connected by a mid shaft (11). The mid shaft (11) is in a sleeve (not shown) of the frame (2) which allows the sprocket wheel assembly (7) to rotate. The left side sprocket wheel (10) may have multiple sprocket wheel elements and a derailer (12) to give additional gear ratio advantage in the overall drive chain.

The left side sprocket wheel (10) is linked to a front sprocket wheel (13) by a chain loop (8). The front sprocket wheel (13) has two sprocket wheel crank arms (14) which are attached to lever arm linkages (15) at spring ends (16) on a rotational pin (17). The lever arm linkage (15) is also attached to the handle bar lever (18) at the linkage fork end (19) on a rotational pin (17, see FIG. 5.

As viewed in FIG. 1, the motion of the fork end (20) of the handle bar lever (18) moves the lever arm linkage (15) forward and backward thus moving the sprocket wheel crank arms (14) causing the front sprocket wheel (13) to rotate about its axis. This rotation is translated back to the rear wheel gear (5) through chain loops (8) and mid sprocket wheel assembly (7).

Referring to FIGS. 1 through 5, the handle bar lever (18) has a fork end (20) and lever arm (21). The fork end (20) is rotationally attached to pivot mount (22) which is attached to the frame (2) adjacent to the steering column (23). There is a lever arm bias spring (24) on the pivot mount shaft (25) to aid in moving the handle bar lever (18) through the top and bottom end points of the lever's motion.

The lever arm (21) has a rotation joint (26) connected to handle bar arm (27) which is rigidly fixed to handle bar shaft (28). A bias bar (29) is also rotationally attached to the frame (2) and to the handle bar shaft (28). The combination of the handle bar lever (18) and bias bar (29) keeps the handle bar shaft (28) relatively perpendicular as the bicycle is powered by the motion of the lever. This is important to the bicycle rider for efficiency of operation and in maintaining balance.

Referring also to FIG. 5A, the lever arm linkage (15) has a linkage bias spring (30) on the rotational pin (17) at the spring end (16). This spring provides a bias at what might be binding points when the sprocket wheel crank arms (14) and lever arm linkage (15) are parallel to each other.

The handle bar lever (18) and bias bar (29) may have friction lock slip points (31) which allow the telescoping of the bars in the event of an accident. A safety cushion (32) may also be mounted on the handle bar (33) for further safety, as illustrated in FIG. 6.

Figures 6, 7:
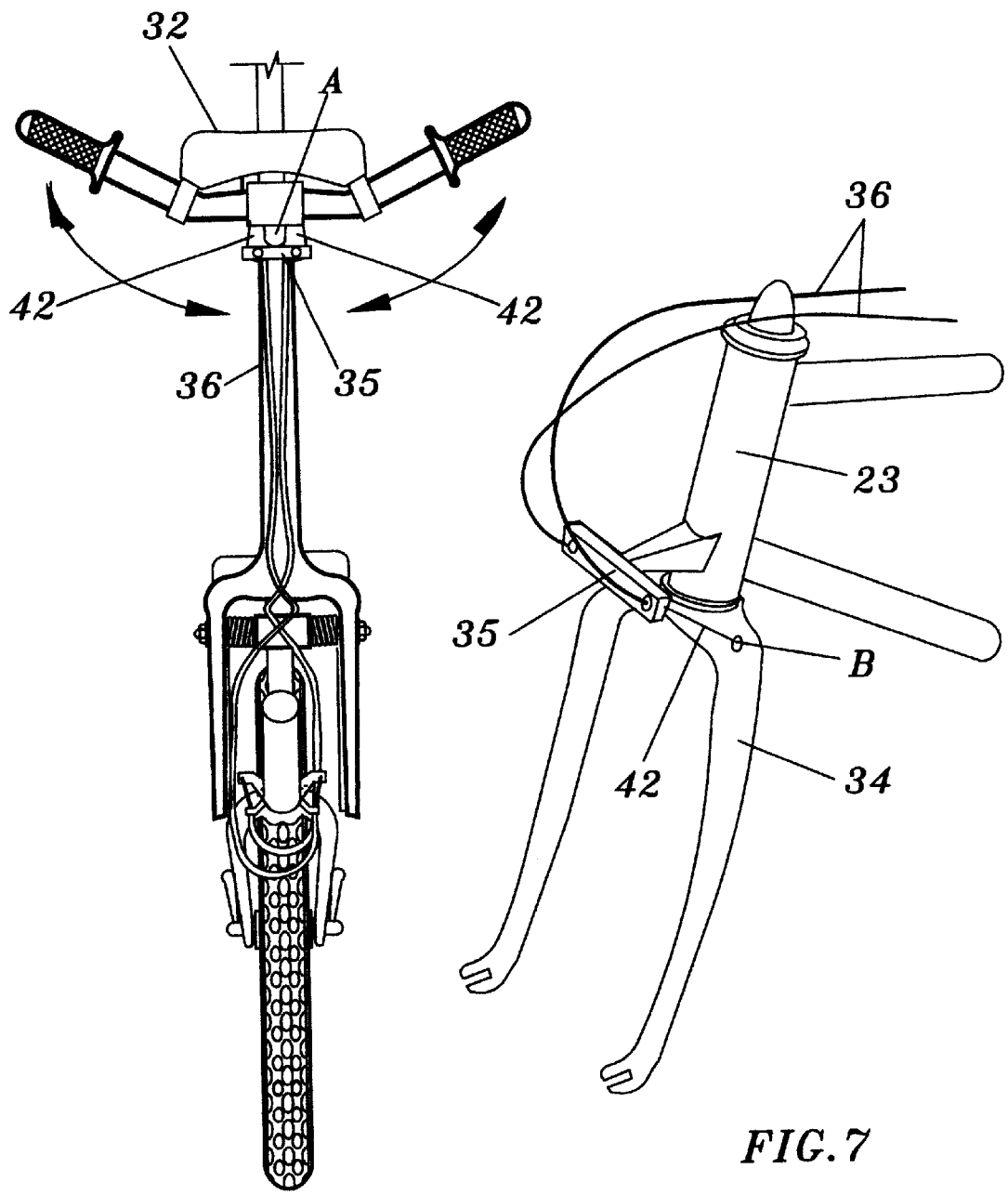
FIG. 6 illustrates a top partial view of the hand powered bicycle with front wheel steering cables and handle bar safety pad.
FIG. 7 illustrates a partial view of the front steering column and the front wheel steering cables.

Referring to FIGS. 2, 6 and 7, the hand powered version of the bicycle (1) is steered by two steering cables (42) attached between the handle bars (33) at point A and the front forks (34) at point B. The handle bar (33) rotates on a pivot post (40) on handle bar shaft (28) at joint (41). The steering cables (42) are crossed intermediate points A and B to provide for steering in the direction the handle bar (33) is turned. Cable stops (35) are used at points A and B to fix the cable sheaths (36).

There are caliper brakes for the hand and leg powered bicycle (1) as are well known on standard bicycles for braking. However, brake pedals (37,38) are provided in the hand powered version to operate the brakes with the feet of the rider. The brakes should be engaged for safety purposes when the handle bar (33) is approximately chest high to the bicycle rider. In the hand powered version of the bicycle (1), a pair of platforms (39) are provided on which the rider rests his/her feet or on which the rider may stand when exercising and powering the bicycle. Chain guards may be used to cover the chain loops (8).

Referring to FIG. 8 an alternate embodiment of the bicycle (1) is illustrated wherein the lower frame members of the elongated frame (2) and brake pedals (37,38) have been removed. There are foot pedals (50) with crank levers (51) attached to the right side sprocket wheel (9) and left side sprocket wheel (10). In this conventional bicycle configuration for foot pedals (50), the user may use hands and feet, including arms and legs, etc., to power the bicycle (1). This provides a more uniform distribution of applied power for exercise of the body by the user. Traditional hand levers (not shown) for braking would be used in this embodiment.

I claim:

1. A cycle for operation by use of the rider's hands and feet comprising:

a frame supported by a front wheel and a rear wheel which rear wheel having a rear wheel gear attached to a rear wheel axle;

a mid sprocket wheel assembly rotationally mounted on the frame intermediate the rear wheel gear to which it is linked by a chain loop and a front sprocket wheel which is rotationally mounted to the frame forward of the mid sprocket wheel assembly and to which it is linked by a second chain loop;

a lever arm linkage rotationally attached at a spring end to a sprocket wheel crank arm of the front sprocket wheel and rotationally attached at a linkage fork end to a fork end of a handle bar lever;

the handle bar lever rotationally attached at the fork end to a pivot mount attached to the frame adjacent to a steering column;

the handle bar lever having a lever arm rotationally attached to a handle bar arm at a rotation point and the handle bar arm rigidly mounted to a handle bar shaft;

a bias bar rotationally attached to the frame rearward of the pivot mount and rotationally attached to the handle bar is of a length to remain parallel with the lever arm as the handle bar lever is moved to power the cycle;

a handle bar rotationally attached to the handle bar shaft wherein the bias bar shaft and a pair of steering cables are attached between the handle bar and a front fork; and a means for braking the cycle.

2. The cycle as in claim 1 wherein the mid sprocket assembly is comprised of a right side sprocket wheel and a left side sprocket wheel joined by a mid shaft.

3. The cycle as in claim 1 wherein there is a lever arm bias spring mounted on a pivot mount shaft of the pivot mount to bias the motion of the handle bar lever.

4. The cycle as in claim 1 wherein there is a linkage bias spring mounted on a rotational pin of the lever arm linkage at the spring end to bias the motion of the lever arm linkage.

5. The device as in claim 1 wherein the lever arm and the bias bar each having a friction lock slip joint.

6. The device as in claim 1 wherein the handle bar having a safety cushion.

7. The device as in claim 1 wherein a pair of platforms are attached to the frame in a position for the rider's feet.

8. The device as in claim 1 wherein the means for braking is a caliper brake connected by a brake cable to a brake pedal.

9. The cycle as in claim 1 wherein a pair of foot pedals are each attached by a crank lever to the mid sprocket assembly.

* * * * *